(12) United States Patent
Fuma et al.

(10) Patent No.: US 8,610,414 B2
(45) Date of Patent: Dec. 17, 2013

(54) VEHICLE-MOUNTED MULTI-PHASE CONVERTER AND DESIGN METHOD THEREOF

(75) Inventors: Hiroo Fuma, Gifu (JP); Yuji Nishibe, Owariasahi (JP); Kota Manabe, Toyota (JP); Nobuyuki Kitamura, Minamitsuru-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 281 days.

(21) Appl. No.: 13/125,247

(22) PCT Filed: Oct. 21, 2009

(86) PCT No.: PCT/JP2009/068442
§ 371 (c)(1),
(2), (4) Date: Apr. 20, 2011

(87) PCT Pub. No.: WO2010/047413
PCT Pub. Date: Apr. 29, 2010

(65) Prior Publication Data
US 2011/0193408 A1    Aug. 11, 2011

(30) Foreign Application Priority Data

Oct. 21, 2008  (JP) ................................ 2008-270707

(51) Int. Cl.
*G05F 1/40*   (2006.01)
(52) U.S. Cl.
USPC .......................................... 323/272; 363/71

(58) Field of Classification Search
USPC ......... 323/222, 224, 225, 237, 266, 271, 272, 323/282–288, 351; 363/123, 131, 163, 164, 363/165; 318/727, 811
See application file for complete search history.

(56) References Cited

U.S. PATENT DOCUMENTS

| | | | | |
|---|---|---|---|---|
| 4,384,321 A | * | 5/1983 | Rippel | 363/124 |
| 4,442,401 A | * | 4/1984 | Jamieson | 323/351 |
| 7,151,364 B2 | * | 12/2006 | Kimura et al. | 323/282 |
| 7,154,349 B2 | * | 12/2006 | Cabanillas | 331/117 R |

(Continued)

FOREIGN PATENT DOCUMENTS

| | | |
|---|---|---|
| CN | 101159411 A | 4/2008 |
| JP | 2005-065384 A | 3/2005 |
| JP | 2005-224058 A | 8/2005 |
| JP | 2007-068392 A | 3/2007 |
| JP | 2008-022594 A | 1/2008 |

OTHER PUBLICATIONS

International Search Report dated May 28, 2010.

(Continued)

*Primary Examiner* — Rajnikant Patel
(74) *Attorney, Agent, or Firm* — Kenyon & Kenyon LLP

(57) ABSTRACT

An object is to miniaturize booster coils used in a vehicle-mounted booster converter. In the design method for a vehicle-mounted multi-phase converter including multiple booster coils and a switching circuit for generating an induced electromotive force at each booster coil by switching of current flowing to each booster coil for applying an output voltage, based on an input voltage and the induced electromotive force generated at each booster coil, to a vehicle drive circuit, a coupling factor indicating the extent by which the induced electromotive force in one of multiple booster coils contributes to the voltage between terminals of another booster coil is determined on the basis of a relationship between the coupling factor and current ripple component of each booster coil.

3 Claims, 4 Drawing Sheets

(56) References Cited

U.S. PATENT DOCUMENTS

| | | | |
|---|---|---|---|
| 7,233,132 B1 | 6/2007 | Dong et al. | |
| 7,298,118 B2* | 11/2007 | Chandrasekaran | 323/222 |
| 7,404,396 B2* | 7/2008 | Toriyama et al. | 123/598 |
| 7,449,867 B2* | 11/2008 | Wu et al. | 323/247 |
| 2002/0125854 A1* | 9/2002 | Williamson | 318/727 |
| 2007/0175701 A1 | 8/2007 | Xu et al. | |

OTHER PUBLICATIONS

Shin, H.B., et al.: "Generalised steady-state analysis of multiphase interleaved boost converter with coupled inductors" IEE Proceedings: Electric Power Applictions, IEE, GB, vol. 152, No. 3, May 2005, pp. 584-594.

Eiji Sato: "Permanent Magnet Synchronous Motor Drives for Hybrid Electric Vehicles", IEEJ Transactions on Electrical and Electronic Engineering, vol. 2, No. 2, Feb. 22, 2007, 2007 Institute of Electrical Engineers of Japan, published by John Wiley & Sons, Inc., pp. 162-168.

B. Eckardt, et al.: "Automotive Powertrain DC/DC Converter with 25kW/dm[sup]3 by using SiC Diodes", Fraunhofer Institute of Integrated Systems and Device Technology (IISB), Erlangen, DE, 2006, 6 pages.

Office Action issued Nov. 15, 2011 in JP2008-270707 & English translation thereof.

Chinese Office Action, dated Jun. 20, 2013, from corresponding Chinese Patent Application No. 200980141810.6.

* cited by examiner ure at each booster coil by switching of current flowing to each booster coil for applying an output voltage, based on an input voltage and the induced electromotive force generated at each booster coil, to a vehicle drive circuit, the switching circuit switches current flowing to each booster coil so that the ratio of the input voltage with respect to the output voltage varies in a predetermined variable range in accordance with travel control of the vehicle and a coupling factor indicating the extent by which the induced electromotive force at one of the plurality of booster coils contributes to the voltage between terminals of another booster coil has a value which is determined such that, when the ratio has a value which is less than or equal to the middle of the variable range, the current ripple component of each booster coil is smaller than the current ripple component of each booster coil in the case where the coupling factor is 0.

VEHICLE-MOUNTED MULTI-PHASE CONVERTER AND DESIGN METHOD THEREOF

This is a 371 national phase application of PCT/JP2009/068442 filed 21 Oct. 2009, claiming priority to Japanese Patent Application No. JP 2008-270707 filed 21 Oct. 2008, the contents of which are incorporated herein by reference.

FIELD OF THE INVENTION

The present invention relates to a vehicle-mounted multi-phase converter and a design method thereof, comprising a plurality of booster coils magnetically coupled to each other, for outputting a voltage in accordance with an induced electromotive force at each coil.

BACKGROUND OF THE INVENTION

Hybrid automobiles and electric automobiles driven by the driving force of a motor are widely used. These motor driven vehicles have a booster converter for boosting a battery voltage and outputting the boosted voltage to a motor drive circuit.

The booster converter has a booster coil and a switching circuit for switching current flowing to the booster coil. The booster coil generates an induced electromotive force by switching of the current. The booster converter outputs to the motor drive circuit a boosted voltage where the induced electromotive force has been added to an input voltage. As a result, the booster converter can output a voltage higher than the battery voltage to the motor drive circuit.

SUMMARY OF THE INVENTION

Technical Problem

A booster coil of a booster converter is often located in the engine compartment of a vehicle. When the volume of the booster coil is large, the necessity for increasing the volume of the engine compartment arises resulting in instances where the passenger compartment is unavoidably narrow.

The present invention is provided in response to this issue. Namely, an object is to miniaturize the booster coil used in a vehicle-mounted booster converter.

Solution to Problem

The present invention is a design method for a vehicle-mounted multi-phase converter comprising a plurality of booster coils and a switching circuit for generating an induced electromotive force at each booster coil by switching of current flowing to each booster coil for applying an output voltage, based on an input voltage and the induced electromotive force generated at each booster coil, to a vehicle drive circuit including a design process for determining a coupling factor indicating the extent by which the induced electromotive force at one of the plurality of booster coils contributes to the voltage between terminals of another booster coil on the basis of a relationship between the coupling factor and a current ripple component of each booster coil.

Furthermore, in the design method relating to the present invention, the design process includes a process for determining the coupling factor on the basis of change in the current ripple component of each booster coil when the ratio of the output voltage with respect to the input voltage is changed.

Furthermore, in a vehicle-mounted multi-phase converter of the present invention comprising a plurality of booster coils and a switching circuit for generating an induced electromotive force at each booster coil by switching of current flowing to each booster coil for applying an output voltage, based on an input voltage and the induced electromotive force generated at each booster coil, to a vehicle drive circuit, a coupling factor indicating the proportion the induced electromotive force at one of the plurality of booster coils contributes to the voltage between terminals of another booster coil is a value of 0.1 or greater and 0.4 or less.

Furthermore, in the vehicle-mounted multi-phase converter relating to the present invention, it is preferable for the switching circuit to switch current flowing to each booster coil so that the ratio of the input voltage with respect to the output voltage varies in accordance with travel control of the vehicle.

Advantageous Effects of the Invention

According to the present invention, the booster coils used in the vehicle-mounted booster converter can be miniaturized.

DETAILED DESCRIPTION

Figure 1:
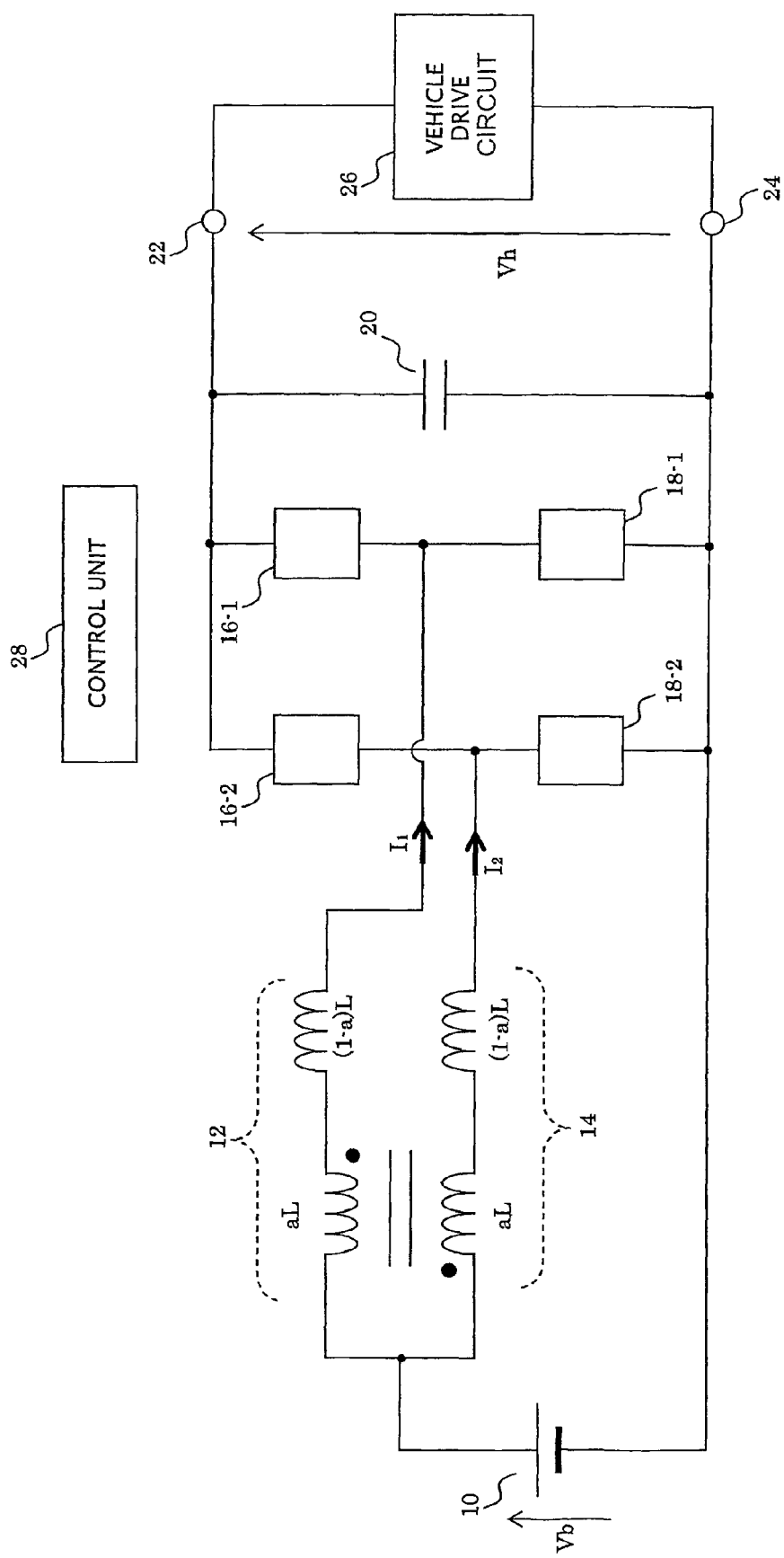
FIG. 1 shows a block diagram of a two-phase multi-phase converter.

FIG. 1 shows a block diagram of a two-phase multi-phase converter relating to a first embodiment of the present invention. The two-phase multi-phase converter has two booster coils magnetically coupled to each other and controls the switching at different timings of the currents flowing to the booster coils. Voltages corresponding to the electromotive force of each booster coil are output from output terminals.

The configuration of the two-phase multi-phase converter will be described. One end of an upper switch 16-1 is connected to one end of a lower switch 18-1. The other end of the lower switch 18-1 is connected to a negative terminal of a battery 10, and a capacitor 20 is connected between the other end of the upper switch 16-1 and the other end of the lower switch 18-1. One end of a first booster coil 12 is connected to a positive terminal of the battery 10 and the other end is connected to a connection between the upper switch 16-1 and the lower switch 18-1.

Similarly, one end of an upper switch 16-2 is connected to one end of a lower switch 18-2. The other end of the lower switch 18-2 is connected to the negative terminal of the battery 10 and the capacitor 20 is connected between the other end of the upper switch 16-2 and the other end of the lower switch 18-2. One end of a second booster coil 14 is connected to the positive terminal of the battery 10 and the other end is connected to a connection between the upper switch 16-2 and the lower switch 18-2.

One end of the capacitor 20 is connected to an output terminal 22 and the other end is connected to an output terminal 24. To the output terminals 22 and 24 are connected a vehicle drive circuit 26, which drives a motor-generator for vehicle drive.

When current flows from the battery 10 to the booster coils or when current flows from the booster coils to the battery 10, the first booster coil 12 and the second booster coil 14 are magnetically negatively coupled so that a magnetic flux generated on one side reduces the magnetic flux on the other side. The first booster coil 12 and the second booster coil 14 are each represented by serially connected inductances of a coupled section aL and an independent section (1−a). Here, a is a coupling factor with a value of 0 or greater and 1 or less. The coupling factor a shows the proportion the induced electromotive force of the first booster coil 12 contributes to the voltage between terminals of the second booster coil 14 and the proportion the induced electromotive force of the second booster coil 14 contributes to the voltage between terminals of the first booster coil 12. Namely, the independent section (1−a)L represents the self inductance of each booster coil and the coupled section aL represents the mutual inductance of the first booster coil 12 and the second booster coil 14. The dots near the coupled sections aL in FIG. 1 signify that when an induced electromotive force is generated for the terminal on the side indicated with a dot considered to be positive at one coupled section aL, an induced electromotive force is generated for the terminal on the side indicated with a dot considered to be positive at the other coupled section aL.

The circuit of FIG. 1 is shown as an equivalent circuit and the actual first booster coil 12 and second booster coil 14 can be configured to be magnetically coupled at a distribution at every part of the winding.

An operation of the two-phase multi-phase converter will be described. A control unit 28 performs on-off control of each switch. By turning on the lower switch 18-1, a current from the positive electrode of the battery 10 flows to the first booster coil 12. Next, by turning off the lower switch 18-1, an induced electromotive force is generated due to a current change in the first booster coil 12. Then, by turning on the upper switch 16-1, a voltage, which is the electromotive force of the first booster coil 12 added to the battery voltage Vb, is applied to the capacitor 20.

Furthermore, by turning on the lower switch 18-2, a current from the positive electrode of the battery 10 flows to the second booster coil 14. Next, by turning off the lower switch 18-2, an electromotive force is generated due to a current change in the second booster coil 14. Then, by turning on the upper switch 16-2, a voltage, which is the electromotive force of the second booster coil 14 added to the battery voltage Vb, is applied to the capacitor 20.

The electromotive force generated at the first booster coil 12 induces a voltage at the second booster coil 14 in accordance with the coupling factor a and the electromotive force generated at the second booster coil 14 induces a voltage at the first booster coil 12 in accordance with the coupling factor a.

By controlling the switches in this manner, the capacitor 20 is charged by a voltage Vh, which is larger than the battery voltage Vb, and the voltage Vh, which is larger than the battery voltage Vb, can be output from the output terminals 22 and 24.

Next, a more specific control operation will be described. The two-phase multi-phase converter relating to the embodiment has the following three control states.

(1) State where the upper switch 16-1 and the lower switch 18-2 are on and the other switches are off.

(2) State where the lower switch 18-1 and the upper switch 16-2 are on and the other switches are off.

(3) State where the lower switches 18-1 and 18-2 are on and the other switches are off.

Hereinafter, the states (1) to (3) will be respectively referred to as upper-1-on state, upper-2-on state, and both-lower-on state. Of course, in general, a both-upper-on state may be taken where the two upper switches are on.

The control unit 28 controls the switches so that the both lower on state follows the upper-1-on and upper-2-on states, such as upper-1-on, both-lower-on, upper-2-on, both-lower-on, upper-1-on, both-lower-on, upper-2-on, both-lower-on, and so forth. Furthermore, the control unit 28 controls the switches so that the time taken for the upper-1-on state and the time taken for the upper-2-on state are equal.

A booster ratio, which is defined as the ratio of the output voltage Vh with respect to the battery voltage Vb, can be adjusted by changing the time T1 taken for the upper-1-on state or the upper-2-on state and the time T2 taken for the both-lower-on state. With the control period fixed at Tc=T1+T2, there is a relationship of α=2(1+T2/T1) between times T1 and T2 and the booster ratio α.

The control unit 28 adjusts the booster ratio and adjusts the output voltage Vh by keeping the control period fixed at Tc=T1+T2 and changing the proportion of time T2 with respect to time T1.

According to this configuration, the control unit 28 can adjust the output voltage of the two-phase multi-phase converter in accordance with travel control of the vehicle and can adjust the voltage provided to the vehicle drive circuit 26. On the basis of the voltage output from the two-phase multi-phase converter, the vehicle drive circuit causes the motor generator to generate an acceleration torque so that the vehicle accelerates or causes the motor generator to generate a braking torque so that the vehicle decelerates.

Next, a design method for the booster coils of the two-phase multi-phase converter will be described. The structure of the first booster coil 12 and the second booster coil 14 is determined on the basis of magnetic saturation performance. Here, the magnetic saturation performance refers to the performance indicating the difficulty of magnetic saturation occurring. Furthermore, magnetic saturation refers to a state where the inductance of the booster coil is non-linear with respect to current. When the current flowing to the booster coil reaches a certain saturation threshold, magnetic saturation occurs and the booster performance of the two-phase multi-phase converter decreases.

Generally, there is a relationship between coil volume and saturation threshold where the larger the coil volume the larger the saturation threshold. Therefore, if it is possible to reduce the saturation threshold, the volume of the booster coil can be reduced. However, to reduce the saturation threshold, it becomes necessary to reduce the current flowing to the booster coil without impairing booster performance.

Here, the current flowing to the booster coil includes a direct current component and a ripple component. Among these, the ripple component contributes to the generation of induced electromotive force in the booster coil, namely, the booster operation in the two-phase multi-phase converter. Therefore, if the direct current component of the booster coil is reduced, the current flowing to the booster coil can be reduced without impairing the booster performance in the two-phase multi-phase converter.

Accordingly, in the two-phase multi-phase converter relating to the embodiment, by magnetically negatively coupling the first booster coil 12 and the second booster coil 14, the direct current component of the current flowing to the booster coils is reduced. By reducing the direct current component of the current flowing to the booster coil, the magnitude of current flowing to the booster coil can be reduced without impairing booster performance. Thus, the saturation threshold can be reduced and the volume of the booster coil can be reduced.

In the two-phase multi-phase converter relating to the embodiment, it was confirmed that when the coupling factor is a, the volume of the booster coil can be approximately (1−a) times compared to when the coupling factor is 0. Namely, with a=0.1, the volume of the booster coil can be reduced approximately 10% compared to when a=0.0.

The structure of the first booster coil 12 and the second booster coil 14 is further determined on the basis of heat dissipation characteristics. The booster coil is designed so that a predetermined temperature is not exceeded in order to ensure the performance of the other parts mounted in the vehicle. In the embodiment, heat dissipation design is accomplished in accordance with the amount of heat generated by the booster coil so that the temperature of the booster coil does not exceed a predetermined temperature. Namely, the larger the amount of heat generated by the booster coil, the volume of the booster coil increases and the amount of generated heat increases. Therefore, the lower the amount of heat generated by the booster coil, the smaller the volume of the booster coil can be.

The booster coil generates heat due to the ripple component of the current. Therefore, by reducing the ripple component without impairing the booster performance, the amount of heat generated by the booster coil can be reduced and the volume of the booster coil can be reduced.

The magnitude of the ripple component depends on the coupling factor a, the booster ratio α, and so forth. Accordingly, conditions for reducing the ripple component will be described hereinafter.

First, Kirchhoff's second law is applied for the case where the control state of the two-phase multi-phase converter is the both-lower-on state. Namely, a closed circuit equation is set up for a current loop from the positive terminal of the battery 10 to the negative terminal of the battery 10 via the first booster coil 12 and the lower switch 18-1 and a current loop from the positive terminal of the battery 10 to the negative terminal of the battery 10 via the second booster coil 14 and the lower switch 18-2. Solving for the closed circuit equation enables the time differential of a current I1 of the first booster coil 12 and the time differential of a current I2 of the second booster coil 14 to be obtained as in the following expression.

$$\frac{dI_1}{dt} = \frac{dI_2}{dt} = -\frac{Vb}{(1-a)L} \quad \text{Expression 1}$$

Vb is the battery voltage and t is the time variable. Furthermore, the inductance of the first booster coil 12 and the inductance of the second booster coil 14 are equal as value L.

Next, Kirchhoff's second law is applied for the case where the control state of the two-phase multi-phase converter is the upper-1-on state. Namely, a closed circuit equation is set up for a current loop from the positive terminal of the battery 10 to the negative terminal of the battery 10 via the first booster coil 12, the upper switch 16-1, and the capacitor 20, and a current loop from the positive terminal of the battery 10 to the negative terminal of the battery 10 via the second booster coil 14 and the lower switch 18-2. Solving for the closed circuit equation enables the time differential of the current I1 of the first booster coil 12 and the time differential of the current I2 of the second booster coil 14 to be obtained as in the following expressions.

$$\frac{dI_1}{dt} = \frac{Vh}{(1-a^2)L} - \frac{Vb}{(1-a)L} \quad \text{Expression 2}$$

$$\frac{dI_2}{dt} = \frac{aVh}{(1-a^2)L} - \frac{Vb}{(1-a)L} \quad \text{Expression 3}$$

Here, Vh is the output voltage.

Furthermore, Kirchhoff's second law is applied for the case where the control state of the two-phase multi-phase converter is the upper-2-on state. Namely, a closed circuit equation is set up for a current loop from the positive terminal of the battery 10 to the negative terminal of the battery 10 via the first booster coil 12 and the lower switch 18-1, and a current loop from the positive terminal of the battery 10 to the negative terminal of the battery 10 via the upper switch 16-2 and the capacitor 20. Solving for the closed circuit equation enables the time differential of the current I1 of the first booster coil 12 and the time differential of the current I2 of the second booster coil 14 to be obtained as in the following expressions.

$$\frac{dI_1}{dt} = \frac{aVh}{(1-a^2)L} - \frac{Vb}{(1-a)L} \quad \text{Expression 4}$$

$$\frac{dI_2}{dt} = \frac{Vh}{(1-a^2)L} - \frac{Vb}{(1-a)L} \quad \text{Expression 5}$$

Figure 2:
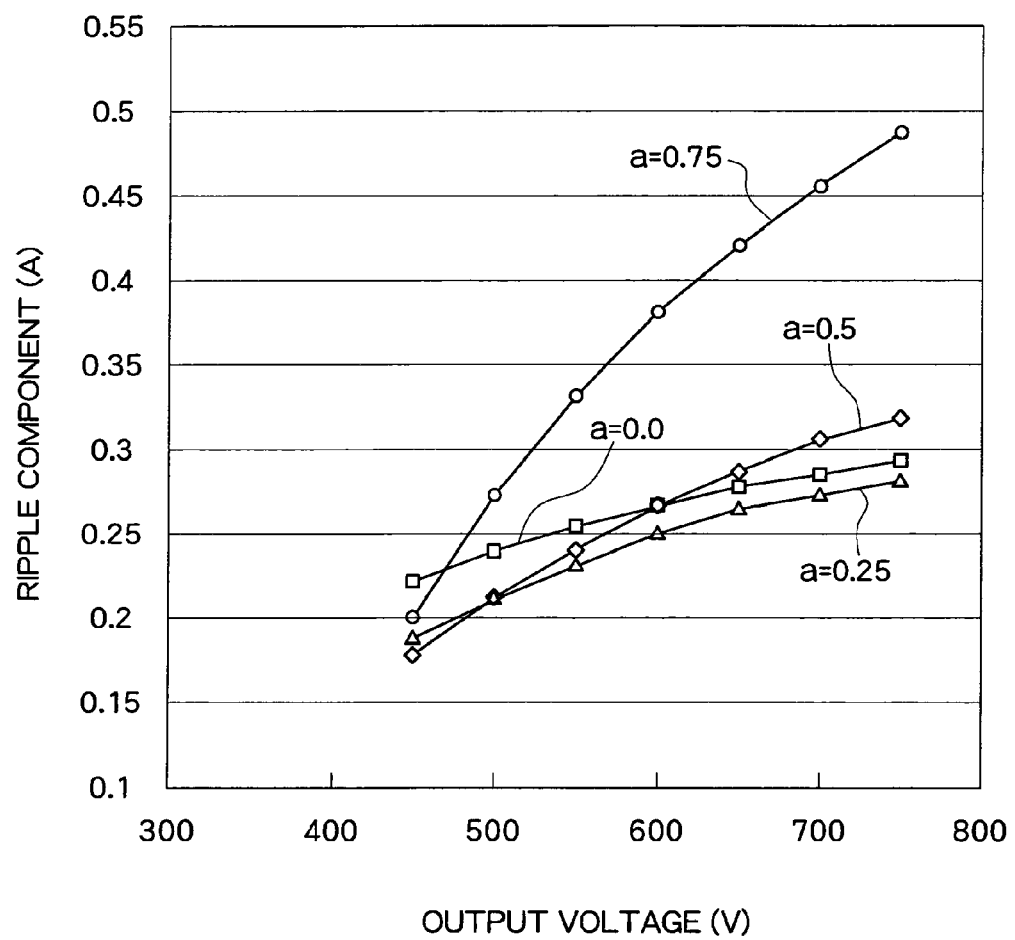
FIG. 2 shows a relationship between output voltage and ripple component of each booster coil for the two-phase multi-phase converter.

FIG. 2 shows the results of obtaining the ripple component of the current flowing to each booster coil when the output voltage Vh is varied in the range of 450 V to 750 V with the battery voltage Vb=200 V in four cases where the coupling factor is a=0.0, a=0.25, a=0.5, and a=0.75. The ripple component of the current flowing to the first booster coil 12 and the ripple component of the current flowing to the second booster coil 14 are equal and the ripple component of FIG. 2 is common to both the first booster coil 12 and the second booster coil 14. The inductance of the first booster coil 12 and the second booster coil 14 is L=500 μH and the control period is Tc=T1+T2=1 μsec.

Furthermore, as shown hereinabove, the relationship of α=Vh/Vb=2(1+T2/T1) for the booster ratio α yields these relationships:

$$T_1 = 2Tc\frac{Vb}{Vh} \qquad \text{Expression 6}$$

$$T_2 = \frac{Vh/Vb - 2}{Vh/Vb}Tc \qquad \text{Expression 7}$$

The ripple component of FIG. 2 is obtained with the time change dt as T1 or T2. Namely, the peak to peak of the current waveform is obtained as the ripple component where the value changes by a value of the right side of expression 2 multiplied by T1 obtained from expression 6 between time 0 to T1, by a value of the right side of expression 1 multiplied by T2 obtained from expression 7 between time T1 to T1+T2, by a value of the right side of expression 4 multiplied by T1 obtained from expression 6 between time T1+T2 to T1+T2+T1, and further by a value of the right side of expression 1 multiplied by T2 obtained from expression 7 between time T1+T2+T1 to T1+T2+T1+T2.

As shown in FIG. 2, the ripple component is smaller with coupling factor a=0.25 than with coupling factor a=0.0. Then, as the coupling factor a increases, the slope with respect to the output voltage Vh of the ripple component increases and the characteristic for coupling factor a=0.5 intersects the characteristic (reference characteristic) for coupling factor a=0.0 in the neighborhood of output voltage Vh=600 V. Namely, on the low voltage side from the point where the characteristics intersect, the ripple component for the case with coupling factor a=0.5 becomes smaller than the ripple component of the reference characteristic, and on the high voltage side from the point where the characteristics intersect, the ripple component for the case with coupling factor a=0.5 becomes larger than the ripple component of the reference characteristic. Furthermore, as the coupling factor a becomes larger the intersection with the reference characteristic moves toward the low voltage side. In the case of coupling factor a=0.75 in the range exceeding output voltage Vh=460 V, the ripple component for the case with coupling factor a=0.75 becomes larger than the ripple component of the reference characteristic. In a motor driven vehicle, such as a hybrid automobile, the output voltage Vh often falls in the range between 450 V to 750 V. Therefore, it is preferable to reduce the ripple component of the current flowing to each booster coil and from the viewpoint of reducing the volume of the booster coils, it is preferable to have the coupling factor at 0.4 or less.

Furthermore, as described hereinabove, from the viewpoint of reducing the volume of the booster coils while avoiding magnetic saturation, it is preferable to have the coupling factor at 0.1 or greater. Thus, it is preferable to have the coupling factor a of the booster coil used in the two-phase multi-phase converter for vehicles at 0.1 or greater and 0.4 or less.

More generally, when the booster ratio is a value less than or equal to the middle of the variable range, it is preferable to determine the coupling factor so that the ripple component of the current flowing to each booster coil is smaller than the ripple component of the current flowing to each booster coil when the coupling factor is set to 0. Namely, in FIG. 2, with the variable range of the output voltage set to Vh=450 V to 750 V, it is preferable to determine the coupling factor so that the characteristic of the ripple component intersects the reference characteristic in the range where the output voltage exceeds 600 V.

Figure 3:
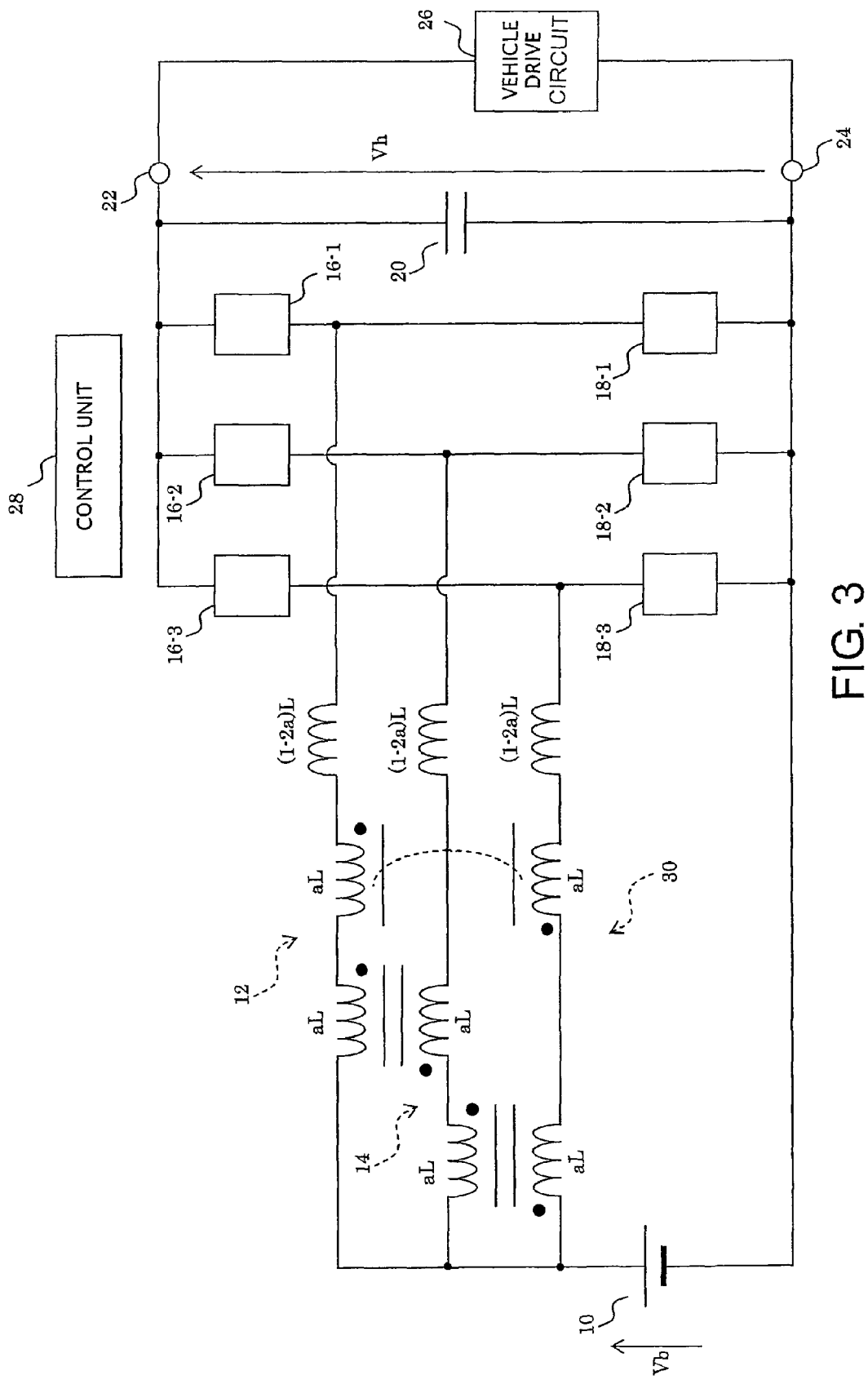
FIG. 3 shows a block diagram of a three-phase multi-phase converter.

Next, a second embodiment of the present invention will be described. FIG. 3 shows a block diagram of a three-phase multi-phase converter relating to the second embodiment.

The three-phase multi-phase converter has three booster coils magnetically coupled to each other and controls the switching at different timings of the currents flowing to the booster coils. Parts identical to those of the two-phase multi-phase converter shown in FIG. 1 are designated like reference characters and their descriptions will be omitted.

The three-phase multi-phase converter further provides to the two-phase multi-phase converter a third booster coil 30, an upper switch 16-3, and a lower switch 18-3. One end of the upper switch 16-3 is connected to one end of the lower switch 18-3. The other end of the lower switch 18-3 is connected to the negative terminal of the battery 10 and the other end of the upper switch 16-3 and the other end of the lower switch 18-3 are connected to both ends of the capacitor 20. Furthermore, one end of the third booster coil 30 is connected to the positive terminal of the battery 10 and the other end is connected to the connection between the upper switch 16-3 and the lower switch 18-3.

The first booster coil 12, the second booster coil 14, and the third booster coil 30 are magnetically negatively coupled so that magnetic flux generated at one booster coil decreases the magnetic flux at the other two booster coils when current flows from the battery 10 to the booster coils or when current flows from the booster coils to the battery 10. The first booster coil 12, the second booster coil 14, and the third booster coil 30 are each represented as serially connected inductances of two coupled sections aL and an independent section (1−a). Here, a is a coupling factor with a value of 0 or greater and 0.5 or less. The coupling factor a shows the proportion the induced electromotive force of one booster coil respectively contributes to the induced electromotive forces of the other two booster coils. Namely, the independent section (1−a) L represents the self inductance of each booster coil and the coupled section aL represents the mutual inductance between two of the three booster coils. The circuit of FIG. 3 is shown as an equivalent circuit and the actual first booster coil 12, second booster coil 14, and third booster coil 30 can be configured to be magnetically coupled at a distribution at every part of the winding.

The three-phase multi-phase converter relating to the embodiment has the following four control states.

(1) State where the upper switch 16-1 and the lower switches 18-2 and 18-3 are on and the other switches are off.

(2) State where the upper switch 16-2 and the lower switches 18-1 and 18-3 are on and the other switches are off.

(3) State where the upper switch 16-3 and the lower switches 18-1 and 18-2 are on and the other switches are off.

(4) State where the lower switches 18-1 to 18-3 are on and the other switches are off.

Hereinafter, the states (1) to (4) will be respectively referred to as upper-1-on state, upper-2-on state, upper-3-on state and all-lower-on state. Of course, in general, an all-upper-on state may be taken where the three upper switches are on and the other switches are off.

The control unit 28 controls the switches to take on the all-lower-on state after the upper-1-on, upper-2-on, and upper-3-on states, such as upper-1-on, all-lower-on, upper-2-on, all-lower-on, upper-3-on, all-lower-on, upper-1-on, all-lower-on, upper-2-on, all-lower-on, and so forth. Furthermore, the control unit 28 controls the switches so that the times of the upper-1-on state, upper-2-on state, and the upper-3-on state are equal.

The three-phase multi-phase converter can adjust the booster ratio, which is defined as the ratio of the output voltage Vh with respect to the battery voltage Vb, by varying the time T1 taken for the upper-1-on state, upper-2-on state, or upper-3-on state, and the time T2 taken for the all-lower-on state. With the control period fixed at Tc=T1+T2, there is a relationship of α=3(1+T2/T1) between times T1 and T2 and booster ratio α.

By fixing the control period at Tc=T1+T2 and varying the proportion of time T2 with respect to time T1, the control unit 28 adjusts the booster ratio and adjusts the output voltage Vh.

According to this configuration, the control unit 28 can adjust the output voltage Vh of the three-phase multi-phase converter in accordance with travel control of the vehicle and can adjust the voltage supplied to the vehicle drive circuit 26.

Next, the design of the booster coils will be described. The first booster coil 12, the second booster coil 14, and the third booster coil 30 are magnetically negatively coupled to each other so that in terms of reducing the volume of the booster coil the design is similar to that in the two-phase multi-phase converter.

Here, the design for reducing the volume of the booster coil will be described by reducing the ripple component of the current flowing to the booster coils and reducing the amount of heat generated by the booster coils.

First, Kirchhoff's second law is applied for the case where the control state of the three-phase multi-phase converter is the all-lower-on state. Namely, a closed circuit equation is set up for a current loop from the positive terminal of the battery 10 to the negative terminal of the battery 10 via the first booster coil 12 and the lower switch 18-1, a current loop from the positive terminal of the battery 10 to the negative terminal of the battery 10 via the second booster coil 14 and the lower switch 18-2, and a current loop from the positive terminal of the battery 10 to the negative terminal of the battery 10 via the third booster coil 30 and the lower switch 18-3. Then, similar to expression 1, solving for the closed circuit equation enables the time differential of the current flowing to each booster coil to be obtained.

Furthermore, Kirchhoff's second law is applied and a closed circuit equation is set up for each state of upper-1-on state, upper-2-on state, and upper-3-on state. Namely, for one of the three booster coils having a connected upper switch that is on, a closed circuit equation is set up for a current loop from the positive terminal of the battery 10 to the negative terminal of the battery 10 via the booster coil, the upper switch, and the capacitor 20, and for one of the three booster coils having a connected lower switch that is on, a closed circuit equation is set up for a current loop from the positive terminal of the battery 10 to the negative terminal of the battery 10 via the booster coil and the lower switch. Then, similar to the case where expression 2 and expression 3 or expression 4 and expression 5 are obtained, the time differential of the current flowing to each booster coil is obtained. As a result, the ripple component of the current flowing to each booster coil can be obtained.

Figure 4A:
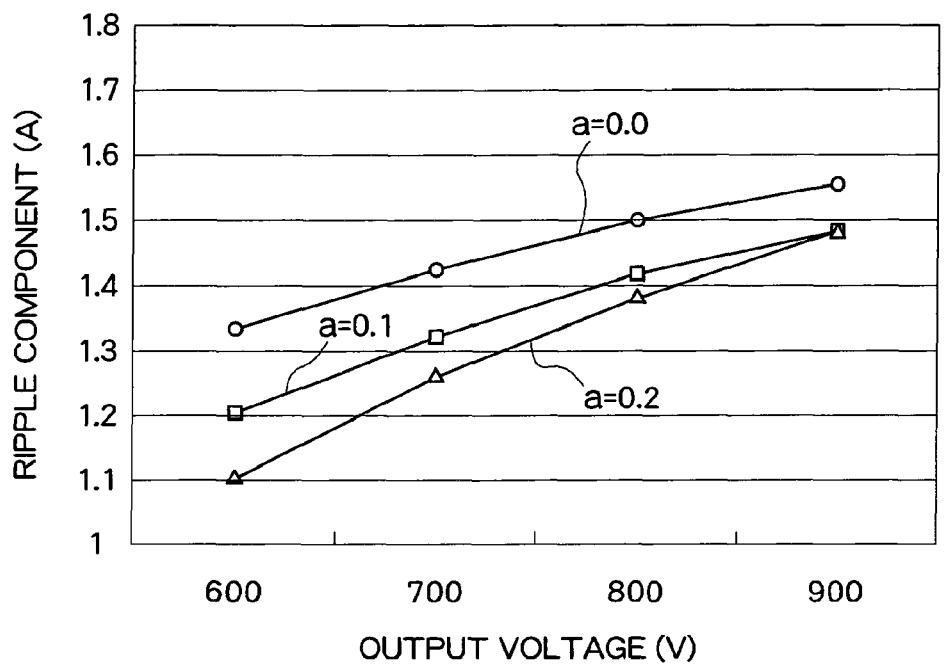
FIGS. 4A and 4B show a relationship between output voltage and ripple component of each booster coil for the three-phase multi-phase converter.
Figure 4B:
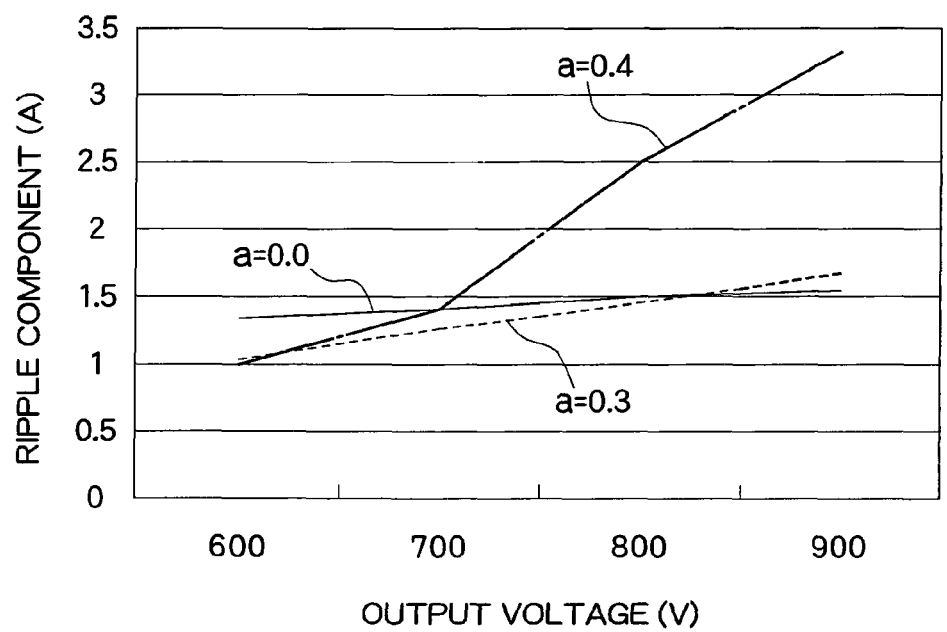

FIGS. 4A and 4B show the results of obtaining the ripple component of the current flowing to each booster coil when the output voltage Vh is varied in the range of 600 V to 900 V with the battery voltage Vb=200 V in five cases where the coupling factor is a=0.0, a=0.1, a=0.2, a=0.3, and a=0.4. FIG. 4B reduces the scale of the vertical axis of FIG. 4A. Here, the inductance of each booster coil is L=100 μH and the control period Tc is Tc=T1+T2=1 μsec.

The ripple component in the case of coupling factor a=0.1 and a=0.2 is smaller than in the case of coupling factor a=0.0. As the coupling factor a increases, the slope with respect to the output voltage Vh of the ripple component increases and the characteristic for coupling factor a=0.3 intersects the characteristic (reference characteristic) for coupling factor a=0.0 in the neighborhood of output voltage Vh=820 V.

Namely, on the low voltage side from the point where the characteristics intersect, the ripple component for the case with coupling factor a=0.3 becomes smaller than the ripple component of the reference characteristic, and on the high voltage side from the point where the characteristics intersect, the ripple component for the case with coupling factor a=0.3 becomes larger than the ripple component of the reference characteristic. Furthermore, as the coupling factor a becomes larger the intersection with the reference characteristic moves toward the low voltage side. In the case of coupling factor a=0.4 in the range exceeding output voltage Vh=700 V, the ripple component for the case with coupling factor a=0.4 becomes larger than the ripple component of the reference characteristic.

The three-phase multi-phase converter is often used in large vehicles rather than in vehicles where the two-phase multi-phase converter is used. Thus, the output voltage Vh often falls in the range between 600 V to 750 V. Therefore, it is preferable to reduce the ripple component of the current flowing to each booster coil and from the viewpoint of reducing the volume of the booster coils it is preferable to have the coupling factor a at 0.4 or less.

Furthermore, as described hereinabove, from the viewpoint of reducing the volume of the booster coils while avoiding magnetic saturation it is preferable to have the coupling factor at 0.1 or greater. Thus, it is preferable to have the coupling factor a of the booster coil used in the three-phase multi-phase converter for vehicles at 0.1 or greater and 0.4 or less.

More generally, similar to the two-phase multi-phase converter, when the booster ratio is a value less than or equal to the middle of the variable range, it is preferable to determine the coupling factor so that the ripple component of the current flowing to the booster coils is smaller than the ripple component of the current flowing to the booster coils when the coupling factor is set to 0. Namely, in FIGS. 4A and 4B, with the variable range of the output voltage Vh set to Vh=600 V to 750 V, it is preferable to determine the coupling factor so that the characteristic of the ripple component intersects the reference characteristic in the range where the output voltage Vh is 675 V or higher.

Embodiments of the present invention were described hereinabove. According to the design method relating to the embodiments of the present invention, it is possible to reduce the ripple component of the current flowing to the booster coil of the multi-phase converter and reduce the volume of the booster coil.

While there has been described what are at present considered to be preferred embodiments of the invention, it will be understood that various modifications may be made thereto, and it is intended that the appended claims cover all such modifications as fall within the true spirit and scope of the invention.

| REFERENCE SIGNS LIST | |
|---|---|
| 10: | Battery |
| 12: | First Booster Coil |
| 14: | Second Booster Coil |
| 16-1 to 16-3: | Upper Switch |
| 18-1 to 18-3: | Lower Switch |
| 20: | Capacitor |
| 22 and 24: | Output Terminal |
| 26: | Vehicle Drive Circuit |
| 28: | Control Unit |
| 30: | Third Booster Coil |

CITATION LIST

Patent Literature
1: JP 2005-65384 A
2: JP 2008-22594 A

The invention claimed is:

1. A vehicle-mounted multi-phase converter comprising:
a plurality of booster coils; and
a switching circuit for generating an induced electromotive force at each booster coil by switching of current flowing to each booster coil;
for applying an output voltage, based on an input voltage and the induced electromotive force generated at each booster coil, to a vehicle drive circuit;
wherein said switching circuit switches current flowing to each booster coil so that the booster ratio of said output voltage with respect to said input voltage varies in a predetermined variable range in accordance with travel control of the vehicle; and
a coupling factor indicating the extent by which the induced electromotive force at one of said plurality of booster coils contributes to the voltage between terminals of another booster coil has a value which is determined such that, when said booster ratio is a value less than or equal to the middle of said variable range, the current ripple component of each booster coil is smaller than the current ripple component of each booster coil in the case where said coupling factor is 0.

2. The vehicle-mounted multi-phase converter according to claim 1, wherein:
the coupling factor indicates the proportion the induced electromotive force in one of said plurality of booster coils contributes to the voltage between terminals of another booster coil and has a value of 0.1 or greater and 0.4 or less.

3. The vehicle-mounted multi-phase converter according to claim 1, wherein:
the coupling factor has a value which is determined such that a ripple component characteristic indicating the current ripple component of each booster coil with respect to the booster ratio and a reference characteristic which is the ripple component characteristic in the case where the coupling factor is 0 intersect in a region in which the booster ratio is greater than the middle of the variable range.

* * * * *